F. F. Bibber,
Boat Hook.
No. 103,007. Patented May 17, 1870.
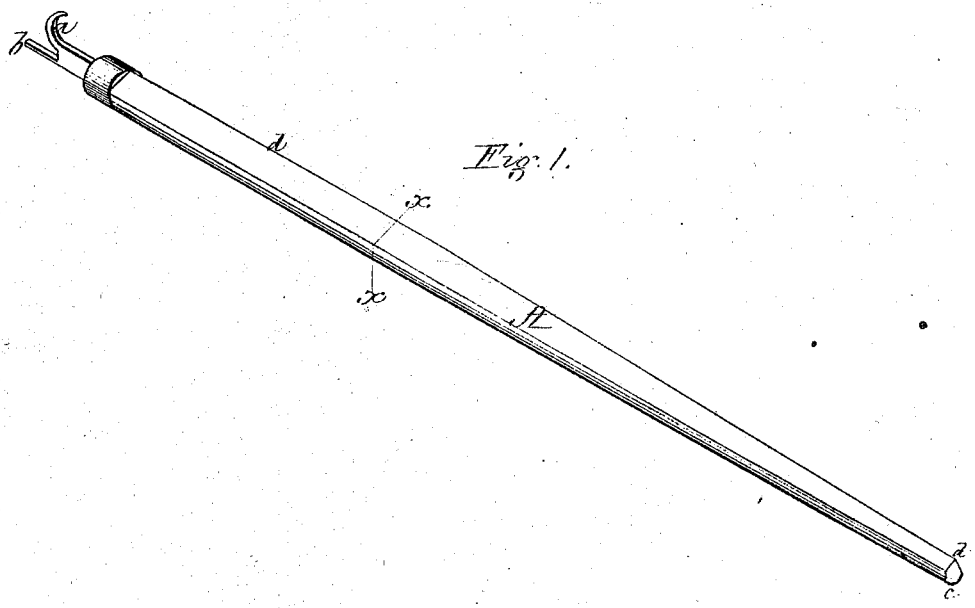
Fig. 1.
Fig. 2.
Witnesses,
P. E. Teschemacher
W. J. Cambridge
Inventor,
Francis F. Bibber

United States Patent Office.

FRANCIS F. BIBBER, OF BOSTON, MASSACHUSETTS.

Letters Patent No. 103,007, dated May 17, 1870.

IMPROVEMENT IN HANDLES FOR BOAT-HOOKS, &c.

The Schedule referred to in these Letters Patent and making part of the same

*To all whom it may concern:*

Be it known that I, FRANCIS F. BIBBER, of Boston, in the county of Suffolk and State of Massachusetts, have invented an Improved Handle for Boat-Hooks, Grappling-Hooks, &c., of which the following is a full, clear, and exact description, reference being had to the accompanying drawings making part of this specification, in which—

Figure 1 is a perspective view of a boat-hook provided with a handle constructed in accordance with my invention.

Figure 2 is a section on the line $x\ x'$ of fig. 1.

In using an ordinary boat-hook at night, considerable difficulty is frequently experienced on account of its being sometimes impossible to see the hook at the end of the pole or handle, and the object to be caught or hooked is often missed, owing to the wrong side of the hook being presented thereto.

My invention has for its object to overcome this objection, and consists in making the handle of a peculiar form, in cross-section, and so applying the hook thereto that the shape of the handle will indicate its position, and the liability of failure to catch the desired object be thereby avoided, while at the same time the hand is enabled to grasp the handle more firmly than where it is of circular form in cross-section, as heretofore.

To enable others skilled in the art to understand and use my invention, I will proceed to describe the manner in which I have carried it out.

In the said drawings—

$d$ is the hook, and $b$ the pike or straight portion, both being forged in one piece, and secured to the end of the handle A in the ordinary manner. This handle is of the form, in cross-section, seen in fig. 2, being rounded at $c$, from which it tapers on both sides nearly to a point, $d$, directly opposite thereto.

The hook and pike are so attached to the handle that the hook will be in line with and on the same side as the portion $d$, so that, when the handle is grasped, the position of the hook will be at once indicated, and all liability of its being presented on the wrong side, either in approaching a mooring at night, or in using the hook under water, and the consequent failure to catch the desired object, are avoided.

Furthermore, the handle, when shaped as above described, affords a much better and firmer grasp for the hands than when it is of a circular form in cross-section, as heretofore, thus enabling the person using the boat-hook to exert a greater degree of force to turn it, as is often required after hooking a rope or other object.

It is evident that my improvement may be applied to the handles of hooks to be used under water for grappling and for other purposes, as well as to boat-hooks, without departing from the spirit of my invention.

Claim.

What I claim as my invention, and desire to secure by Letters Patent, is—

The handle A, made substantially as described, for the purpose of indicating the position of the hook $a$, as set forth.

In testimony whereof I have hereunto set my hand this 28th day of March, A. D. 1870.

FRANCIS F. BIBBER.

Witnesses:
N. W. STEARNS,
W. J. CAMBRIDGE.